(12) United States Patent
Schroeder et al.

(10) Patent No.: US 8,108,249 B2
(45) Date of Patent: Jan. 31, 2012

(54) BUSINESS PLANNER

(75) Inventors: Glenn George Schroeder, Neenah, WI (US); Angela Kay Klim, Neenah, WI (US); George Murray Heinz, Naperville, IL (US); Kelly Loren Phillips, Hortonville, WI (US); William James Raynor, Jr., Appleton, WI (US); Brett David Sengbusch, Oshkosh, WI (US); Jeffrey Dean Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1915 days.

(21) Appl. No.: 10/302,406

(22) Filed: Nov. 22, 2002

(65) Prior Publication Data

US 2003/0130883 A1    Jul. 10, 2003

Related U.S. Application Data

(60) Provisional application No. 60/336,564, filed on Dec. 4, 2001.

(51) Int. Cl.
*G06Q 10/00* (2006.01)
*G06Q 30/00* (2006.01)

(52) U.S. Cl. ..... 705/7.37; 705/731; 705/7.38; 705/14.13
(58) Field of Classification Search ............... 705/8, 10, 705/7.37, 7.31, 7.38, 14.13, 14; 707/100
See application file for complete search history.

(56) References Cited

U.S. PATENT DOCUMENTS

| | | | |
|---|---|---|---|
| 5,615,109 A * | 3/1997 | Eder | 705/8 |
| 5,657,453 A * | 8/1997 | Taoka et al. | 705/1 |
| 5,717,866 A * | 2/1998 | Naftzger | 705/14 |
| 5,774,868 A * | 6/1998 | Cragun et al. | 705/10 |
| 5,953,707 A * | 9/1999 | Huang et al. | 705/7.25 |
| 5,974,396 A * | 10/1999 | Anderson et al. | 705/10 |
| 6,009,407 A * | 12/1999 | Garg | 705/10 |
| 6,029,139 A * | 2/2000 | Cunningham et al. | 705/10 |
| 6,044,357 A * | 3/2000 | Garg | 705/10 |
| 6,151,582 A * | 11/2000 | Huang et al. | 705/8 |
| 6,205,431 B1 | 3/2001 | Willemain et al. | |
| 6,205,433 B1 | 3/2001 | Boesch et al. | |
| 6,205,437 B1 | 3/2001 | Gifford | |
| 6,205,446 B1 | 3/2001 | Mittal et al. | |

(Continued)

OTHER PUBLICATIONS www-sop.inria.fr—Definition of Kalman Filtering Technique.*

(Continued)

*Primary Examiner* — Peter Choi
(74) *Attorney, Agent, or Firm* — Denise L. Stoker; Alyssa A. Dudkowski

(57) ABSTRACT

A method and system for predicting the profit attributable to a proposed sales promotion of a product, wherein the product has a wholesale price and a manufacturing cost per unit sales, including establishing a base volume for sales of the product in the absence of promotions; determining a sales lift for the plurality of single promotions; and correlating the sales lift with promotion information to provide a sales lift model. The method and system also include proposing a promotion having a cost per unit sales for a promotion time period and having a planned sale price for the product; applying the sales lift model to the proposed promotion to predict sales of the product for the promotion time period; and calculating manufacturer profit based upon the product's predicted sales, cost per unit sales for promotion, wholesale price, and manufacturing cost per unit sales during the promotion time period.

14 Claims, 7 Drawing Sheets

U.S. PATENT DOCUMENTS

| | | | | |
|---|---|---|---|---|
| 6,253,187 | B1* | 6/2001 | Fox | 705/10 |
| 6,286,005 | B1* | 9/2001 | Cannon | 707/100 |
| 6,507,851 | B1* | 1/2003 | Fujiwara et al. | 707/104.1 |
| 6,567,786 | B1* | 5/2003 | Bibelnieks et al. | 705/14 |
| 6,708,156 | B1* | 3/2004 | Gonten | 705/10 |
| 6,834,266 | B2* | 12/2004 | Kumar et al. | 705/10 |
| 7,155,402 | B1 | 12/2006 | Dvorak | |
| 7,197,473 | B2 | 3/2007 | Li | |
| 7,617,119 | B1* | 11/2009 | Neal et al. | 705/7.35 |
| 7,660,734 | B1* | 2/2010 | Neal et al. | 705/7.29 |
| 7,877,286 | B1* | 1/2011 | Neal et al. | 705/7.31 |
| 2002/0123930 | A1* | 9/2002 | Boyd et al. | 705/14 |
| 2005/0267791 | A1 | 12/2005 | LaVoie et al. | |

OTHER PUBLICATIONS

Inman, Jeffrey and McAlister, Leigh, "A Retailer Promotion Policy Model Considering Promotion Signal Sensitivity", 1993.*

Blattberg, Robert and Evin, Alan, "Modelling the Effectiveness and Profitability of Trade Promotions", 1987.*

Craig, Thomas, "Supply Chain Management", www.ltdmgmt.com, Jan. 1999 [retrieved Feb. 23, 2005], pp. 1-3, retrieved from: Google. com.*

Anderson, Evan E. and Henry N. Amato, "A Mathematical Model for Simultaneously Determining the Optimal Brand-Collection and Display-Area Allocation," *Operations Research*, vol. 22, No. 1, Jan.-Feb. 1974, pp. 13-21.

Baker, R.C. and Timothy L. Urban, "A Deterministic Inventory System with an Inventory-Level-Dependent Demand Rate," *Journal of the Operational Research Society*, vol. 39, No. 9, Sep. 1988, pp. 823-831.

Baker, R.C. and Timothy L. Urban, "Single-Period Inventory Dependent Demand Models," *Omega: The International Journal of Management Science*, vol. 16, No. 6, 1988, pp. 605-607.

Bayus, Barry L. and William P. Putsis, Jr., "Product Proliferation: An Empirical Analysis of Product Line Determinants and Market Outcomes," *Marketing Science*, vol. 18, No. 2, 1999, pp. 137-153.

Borin, Norm et al., "A Model for Determining Retail Product Category Assortment and Shelf Space Allocation," *Decision Sciences*, vol. 25, No. 3, May/Jun. 1994, pp. 359-384.

Borin, Norm and Paul Farris, "A Sensitivity Analysis of Retailer Shelf Management Models," *Journal of Retailing*, vol. 71, No. 2, Summer 1995, pp. 153-171.

Bultez, Alain and Philippe Naert, "S.H.A.R.P.: SHelf Allocation for Retailers' Profit," Marketing Science, vol. 7, No. 3, Summer 1988, pp. 211-231.

Chapman, Pete et al., "CRISP-DM 1.0: Step-By-Step Data Mining Guide," SPSS Inc., Aug. 2000, printed from Internet web page "www.crisp-dm.org/CRISPWP-0800.pdf," pp. 1-78.

Cooper, Lee G. et al., "PromoCast™: A New Forecasting Method for Promotion Planning," *Marketing Science © 1999 INFORMS*, vol. 18, No. 3, 1999, pp. 301-316.

Corstjens, Marcel and Peter Doyle, "A Model for Optimizing Retail Space Allocations," *Management Science*, The Institute of Management Sciences (TIMS), vol. 27, No. 7, Jul. 1981, pp. 822-833.

Curhan, Ronald C., "The Relationship Between Shelf Space and Unit Sales in Supermarkets," *Journal of Marketing Research*, vol. IX, No. 4, Nov. 1972, pp. 406-412.

Curhan, Ronald C., "Shelf Space Allocation and Profit Maximization in Mass Retailing," *Journal of Marketing*, vol. 37, No. 3, Jul. 1973, pp. 54-60.

Drèze, X. and F. Zufryden, "A Web-Based Methodology for Product Design Evaluation and Optimisation," *Journal of the Operational Research Society*, vol. 49, No. 10, Oct. 1998, pp. 1034-1043.

Garson, G. David, "Log-Linear, Logit, and Probit Models," Internet web page "http://www2.chass.ncsu.edu/garson/pa765/logit.htm", North Carolina State University, Raleigh, North Carolina, Fall 2002, pp. 1-20.

Hiquet, Bradley D. and A.F. Kelly, *SAP R/3 Implementation Guide: A Manager's Guide to Understanding SAP*, Macmillan Technical Publishing, 1998, pp. 36-40, 110-126, 203-221, 326-351.

Keller, Gerhard and Thomas Teufel, *SAP R/3 Process-Oriented Implementation*, published by Addison Wesley Longman Limited, England, 1998, pp. 75-91, 179-283.

Nijs, Vincent R. et al., "The Category-Demand Effects of Price Promotions," *Marketing Science © 2001 INFORMS*, vol. 20, No. 1, Winter 2001, pp. 1-22.

Pedrick, James H. and Fred S. Zufryden, "Measuring the Competitive Effects of Advertising Media Plans," *Journal of Advertising Research*, vol. 33, No. 6, Nov./Dec. 1993, pp. 11-20.

Sethuraman, Raj et al., Asymmetric and Neighborhood Cross-Price Effects: Some Empirical Generalizations, *Marketing Science*, vol. 18, No. 1, 1999, pp. 23-41.

Smetannikov, Max, "MPLS VPNs Controversial," *Interactive Week*, Beverly Hills, CA, Oct. 15, 2001, p. 20.

Tellis, Gerard J. and Fred S. Zufryden, "Tackling the Retailer Decision Maze: Which Brands to Discount, How Much, When and Why?" *Marketing Science—The Marketing Journal of INFORMS*, vol. 14, No. 3 (Part 1 of 2), 1995, pp. 271-299.

Urban, Glen L., "A Mathematical Modeling Approach to Product Line Decisions," *Journal of Marketing Research*, vol. VI, No. 1, Feb. 1969, pp. 40-47.

Urban, Timothy L., "An Inventory-Theoretic Approach to Product Assortment and Shelf-Space Allocation," *Journal of Retailing*, vol. 74, No. 1, Spring 1998, pp. 15-35.

Weiss, Sholom M. and Nitin Indurkhya, *Predictive Data Mining: A Practical Guide*, Sections 4.2-5.2.2, Morgan Kaufmann Publishers, Inc., San Francisco, CA, 1998, pp. 86-125

Welti, Norbert, "Realization Phase," "Preparation Phase," and "Overall Project Phases," Chapters 5-8 of *Successful SAP R/3 Implementation: Practical Management of ERP Projects*, Addison Wesley Longman Limited, England, 1999, pp. 75-112.

Zufryden, Fred S., "A Dynamic Programming Approach for Product Selection and Supermarket Shelf-Space Allocation," *Journal of the Operational Research Society*, vol. 37, No. 4, Apr. 1986, pp. 413-422.

Zufryden, Fred S., "A Model for Relating Advertising Media Exposures to Purchase Incidence Behavior Patterns," *Management Science: Journal of The Institute of Management Sciences*, vol. 33, No. 10, Oct. 1987, pp. 1253-1266.

Zufryden, Fred S., "Predicting Trial, Repeat, and Sales Response from Alternative Media Plans," *Journal of Advertising Research*, vol. 40, No. 6, Nov./Dec. 2000, pp. 65-72.

Zufryden, Fred S., "The WNBD: A Stochastic Model Approach for Relating Explanatory Variables to Consumer Purchase Dynamics," *The International Journal of Research in Marketing*, vol. 8, 1991, pp. 251-258.

Chase, Charles W. Jr., "Customer Demand Forecasting" *Journal of Business Forecasting*, vol. 13, No. 3, Fall 1994, 4 pages.

* cited by examiner

BUSINESS PLANNER

CROSS-REFERENCE TO RELATED APPLICATION

This application claims the benefit of U.S. Provisional Application No. 60/336,564, filed Dec. 4, 2001, herein incorporated by reference.

BACKGROUND

In marketing a product across many geographical regions or through multiple retailers, multiple teams of sales personnel are typically involved. Each team may establish their own program for promotional activities (coupons, temporary price reductions, etc.) with the retailer for which they are responsible or for the market or region they supervise. Experience may be a guide as to the impact a particular promotion may have on product sales, allowing sales staff to estimate, for example, that a 10% price reduction may result in a 50% increase in sales.

SUMMARY OF THE INVENTION

Accurate models, however, have not been available for evaluating multiple proposed promotion plans in terms of sales increase and profitability. In fact, promotional plans in many cases are solely or primarily focused on increasing sales volume, and frequently are executed without direct consideration of profitability. This is due, in part, to the lack of useful tools for planning and assessing profitability of promotions.

Salespersons do not have access to a planning system that allows them to compare multiple promotional scenarios, or that allows retailers to understand the impact on sales and profits of the promotions being considered. There has been a long-standing need for a reliable means for estimating the return on investment (ROI) for a promotion such as a coupon campaign or a two-for-one sale. There has also been a need for contemplated promotional plans to be tied to production plans and/or marketing objectives of the manufacturer. An integrated system of tying promotion plans and predicted sales results from multiple regions or markets to corporate business plans appears to have been lacking in the past. Further, there has been a need for a system that may integrate widespread promotion and production plans, particularly on an international level, to ensure that business plans effectively fulfill corporate objectives.

A computerized business planner system has been developed to allow sales staff and, optionally, retail personnel at multiple locations to plan sales promotions for specific products in a manner that may be tied to manufacturer production and marketing plans, and in a manner that permits estimation of the increased consumer sales volume due to the promotions. The system optionally includes an estimation of profit to both manufacturer and retailer. The business planner system provides an exploratory decision support and planning tool for sales staff and their retail associates. The business planner system may also link and integrate planned promotions from multiple sites to production plans of the manufacturer, so that planned production may be in line with projected increases in sales, or so that promotion plans may be iteratively adjusted to comply with marketing objectives or production plans, including production limitations and other factors in the supply chain of the manufacturer.

More specifically, the scope of the present invention includes a method and system for predicting the profit attributable to a proposed sales promotion of a product, wherein the product has a wholesale price and a manufacturing cost per unit sales, including establishing a base volume for sales of the product in the absence of promotions; determining a sales lift for the plurality of single promotions; and correlating the sales lift with promotion information (e.g., the promotion type and discount value) to provide a sales lift model. The method and system also include proposing a promotion having a cost per unit sales for a promotion time period and having a planned sale price for the product; applying the sales lift model to the proposed promotion to predict sales of the product for the promotion time period; and calculating manufacturer profit based upon the product's predicted sales, cost per unit sales for promotion, wholesale price, and manufacturing cost per unit sales during the promotion time period.

Other objects and advantages of the present invention will become more apparent to those skilled in the art in view of the following description and the accompanying drawings.

DETAILED DESCRIPTION OF THE PREFERRED EMBODIMENTS

Figure 1:
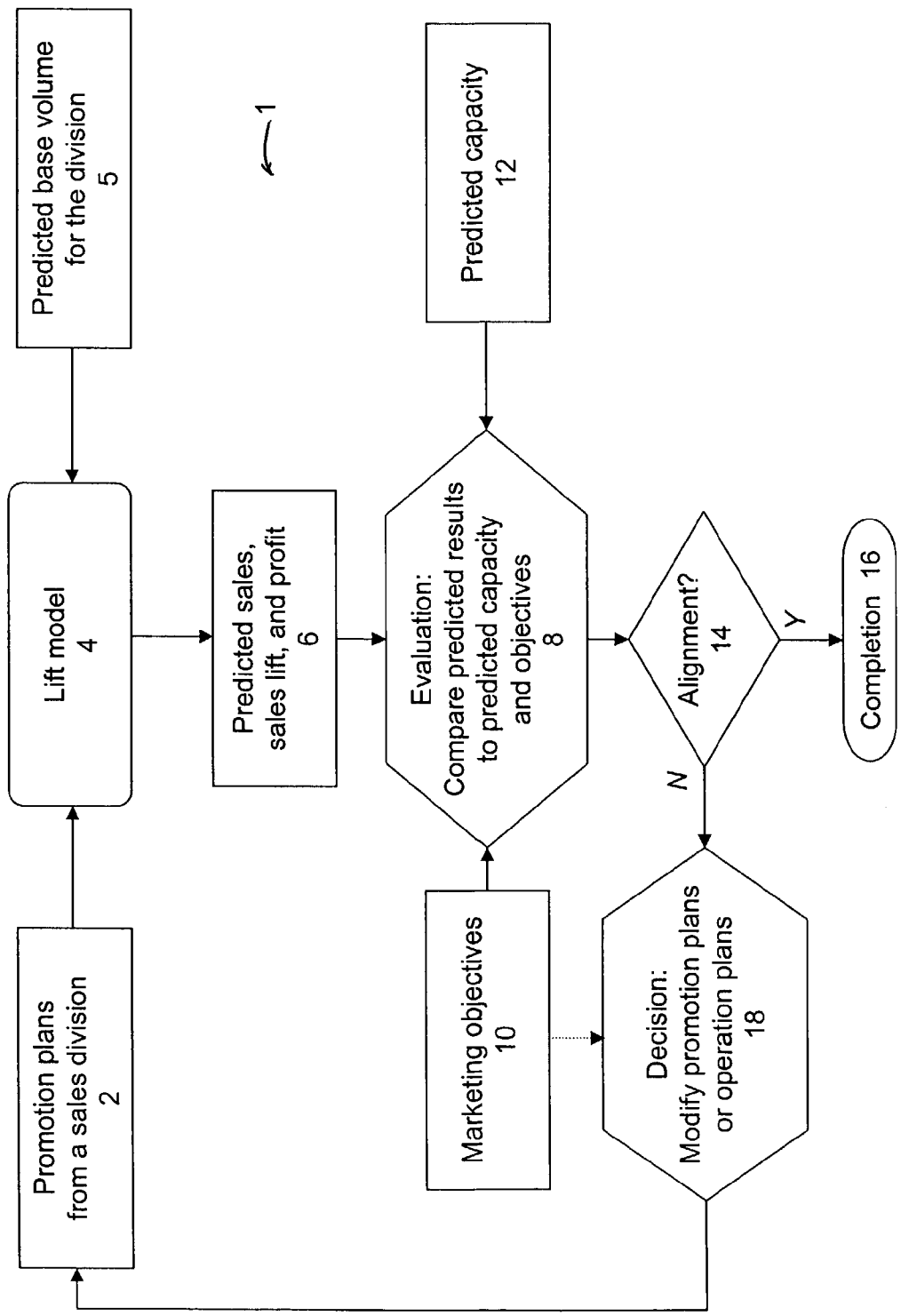
FIG. 1 is a flowchart illustrating several features of a business planner system.

As used herein, "supply chain" refers to the chain of events from acquisition of raw materials to the production of goods and their distribution to retail environments. The supply chain for a product may involve obtaining raw materials for manufacture, use of the raw materials in a production setting to produce the product, warehousing the product if applicable, shipping of the product to a retailer or intermediate distributor or warehouse, followed by whatever additional steps are needed to place the product into control of the retailer. Information pertaining to supply chain management may pertain to mill information about planned and current production, warehousing information, shipping plans, and so forth, and may include projected demand and shipping needs and other factors that may affect the availability of a product at a particular time.

As used herein, "lift" refers to the increase in sales volume caused by a promotion. For example, a temporary price reduction of 10% during a one-week period might result in a 50% increase in sales during that period.

As used herein, "lift model" refers to a mathematical model for predicting the lift in consumer sales of a product or the increase in sales for a related product category for a specific customer (or group of customers), apparently caused by a product promotion, obtained by correlation of past sales performance in light of contemporary promotions and base volume, or by any other suitable technique.

As used herein, "promotion" refers to a temporary action taken to increase consumer sales of a product during the time period in which the promotion is offered. Any type of promotion may be considered. Examples of well-known promotion types include the following:

1. A Temporary Price Reduction (TPR), wherein a retailer offers a product at a reduced price.
2. Rewards for multiple purchases, such as a "buy two, get one free" promotion.
3. Commercial advertising, especially at an increased level relative to normal practice to cause a temporary increase in sales, either with or without an advertised reduction in price or other tangible incentive to purchase. Advertising may be used in combination with any other promotion, and may be in any suitable medium. This promotion includes other suitable promotion methods, or combinations thereof. Advertising may be in any known medium, such as print, billboards, Internet ads, television, radio, and the like.
4. Special merchandise treatments by using various display types such as power walls, gondola ends, and floor stacks.
5. Loyalty card promotions, including smart card transactions, wherein the purchaser receives a discount when the product is purchased and a loyalty card is used.
6. Coupon promotions offering consumers cents off for single or multiple purchases with presentation of the coupon at time of purchase.
7. Temporary increased value systems, wherein higher value is temporarily offered, such as offering a larger quantity of product or another prize or product or coupon provided with the product being purchased, while the price of the product itself may be unchanged.
8. Sweepstakes and related programs wherein the purchaser of a product is eligible to win a prize, including instant winner promotions wherein a hidden message on or in the product that is revealed after purchase indicates whether the purchaser has won.
9. Rebate programs, including mail-in rebate systems and instant rebates, wherein the purchaser is offered cash back immediately or shortly after purchase of the product.
10. Media, sampling, coupon, or other broadcast promotions that encourage the consumer to purchase products in addition to discounts and merchandising offered by retailers. In this case, the base volume for the product in the promotion period may be increased beyond the additional incremental lift caused by retailer based promotions.

The promotion information pertaining to a particular promotion type may include the promotion type, the level of discount or other quantified measure of the offered incentive (e.g., sweepstakes grand prize amount, expected winnings per customer for a sweepstakes, approximate cash value of non-cash incentives, etc.), cost of the promotion (e.g., cost per capita or cost per consumer of advertising, cost of retailer fees paid by the vendor plus discount cost, etc.), and the like. Such information can be used to correlate past sales performance for a product to promotion activity. In correlations or other analyses performed on the promotion information, the promotion information can be treated at any desired level of detail. For example, past promotions of a single type but with varying discount levels may be treated separately or grouped together.

As used herein, "promotion time period" refers to the time that a promotion is in effect to the consumer. During this period some type of pricing discount, new or increased consumer incentive, or merchandising activity must exist to generate incremental consumer demand for the product. The promotion time period may range from one day to eight weeks or longer. Longer time periods may be handled, if desired, through the use of back-to-back promotion periods.

As used herein, "planning interval" refers to a period of time over which business and promotion plans are made and integrated. For example, a six-month period is commonly used for calendaring and management forecasting purposes, and serves as a suitable planning interval. Other useful planning intervals may be but are not limited to any of the following, which are offered by way of illustration only: 2 months, 3 months, 4 months, 8 months, 12 months, 18 months, and 24 months.

As used herein, "base volume" refers to sales volume for a market or market site that occurs or would occur in the absence of short-term promotions. Base volume may increase or decrease over time due to changes in seasonality, demographics, competitive products, consumer demand, and so forth. Base volume may be estimated with fair accuracy using point-of-sale scanner data for periods free of promotions, but scanner data is not always available or affordable. There is a need to estimate base volume from shipping data, but the volume of a product that is shipped may be influenced by many factors that obscure base volume. Prior methods for estimating base volume are based largely on manual estimates obtained from plots of shipped volume over time, in which peaks corresponding to promotions are at least partially ignored. Automated methods based on peak truncation and smoothing of curves fail to provide reliable estimates and leave the user with no estimate of the accuracy of the prediction. Estimation of base volume in light of dramatically large peaks of sales volume obscures the actual volume sold or the base volume.

To strengthen the predictive abilities of the business planner system, improved robust methods for base volume determination have been developed. These methods not only provide more accurate estimates than were previously possible, but also provide estimates of the accuracy of the base volume prediction. With the improved methods, scanner data does not need to be purchased to determine base volume with a known amount of accuracy.

In general terms, the robust method includes the following steps:
a) Obtaining shipping data over time;
b) Normalizing the data;
c) Truncating large peaks associated with promotions;
d) Filtering or smoothing the data, preferably with a dynamic linear model (or Kalman filter) applied to the series data first in one direction and then in the reverse direction;
e) Performing regression on the data, preferably a non-parametric regression such as support vector regression, to obtain regression estimates;
f) Smoothing the regression estimates;
g) Determining the base volume for any period of time as the mean of the regression estimates for that period.

Non-parametric regression offers advantages over parametric regression in that the estimates are more robust for the purposes of the present invention. Support vector regression, a recent development in regression practice, allows the user to minimize the risk of the prediction to achieve a specified acceptable level of error.

As used herein, "promotion cross effects and drop off" is the activity of reducing base volume on related products or on the same product after the promotion has ended to reflect consumer switching during promotion periods and household pantry loading when promotions offer significant short term incentives that cause such consumer behaviors. For example, a consumer may not need to purchase a product immediately following a promotion because that person took advantage of the promotion and purchased more than was required during the promotion.

As used herein, "product" refers to any article that can be marketed and sold, and may include any article known to be sold in a retail environment such as a supermarket, specialty shop, mall, or the like. Products can also refer to wholesale goods or goods distributed through channels other than retail stores, such as medical supplies, items sold via e-commerce or by Internet distributors, business-to-business products, and the like. Products may include items manufactured in factories, made by hand, grown on a farm, harvested from plants or animals, mined or extracted from natural resources, and the like. In many cases, products are produced or marketed by a vendor and sold to customers by a distributor, which may be a retailer operating in a retail environment.

As used herein, a "product category" refers to a set of related articles that are grouped together for consolidation of results. For example, a company offering premium diapers in three sizes may refer to the premium diaper category. Combining regular diapers of the same brand name with premium diapers may yield a broader brand-name category. Combining the brand-name diapers with diapers sold under third-party names but still made by the same manufacturer may yield a general diaper category. Combining diaper sales information with combined feminine care product sales and incontinence product sales may yield a large absorbent article category.

As used herein, a "market" refers a segment of the economy based on a factor such as location, income, age, product need, distributor type, and so forth. Thus, absorbent articles may be sold to a Utah market, a teenage market, a vending machine market, and so forth. A "market site" refers to a specific subset of the market having a specific retailer such as a chain of store or a single store.

As used herein, the "manufacturer" is normally taken to be the entity (or collection of entities) that produces the product or products to be distributed to a retailer. It is understood that agencies representing the manufacturer may also oversee the distribution of product to the retailer and be encompassed in the term manufacturer without necessarily manufacturing the product. Therefore, as used herein, manufacturer is generally synonymous with vendor.

As used herein, "customer" refers to a distributor (e.g., a retailer) or similar entity that purchases products from a manufacturer or a distributor.

As used herein, "consumer" refers to a person, business, or similar entity that purchases products on the retail market from a retailer or similar entity.

The business planner system is a computerized tool that accepts assumptions for arbitrary scenarios and permits prediction of the effects likely to be realized by a planned or prophetically considered promotion for one or more products or product classes in one or more markets and/or for one or more distributors. Predicted effects may include at least one of consumer sales lift, expected ship quantities and timing, retailer profit or revenue, and manufacturer profit or revenue. Using a business planner system, business plans from multiple markets may be scheduled, integrated, and tied to corporate production and marketing plans, allowing production and marketing for future time intervals to be planned in detail, with estimates of profitability.

A business planner system may be hosted on a central server accessible remotely by other computers over a network, or may be divided into interacting modules hosted on a plurality of computers, including central manufacturer servers, retailer servers, and sales staff personal computers.

Electronic Data Interchange (EDI), which refers to computer-to-computer electronic exchange of machine-processible business data documents, may be implemented in any of several forms, and may be used for the electronic integration of local sales staff marketing plans with manufacturer data and projections for sales, operations, prices, and distribution. An EDI system may add further links or interfaces to tie into retailer sales plans, profitability estimates, shelf space allocation proposals, transaction systems, and the like. An exemplary transaction EDI system is the SAP R/3 system. Principles of implementing a SAP R/3 system are described in the following references:

*Successful SAP R*3 *Implementation: Practical Management of ERP Projects* by Norbert Welti, New York: Addison-Wesley Pub Co., 1999 (ISBN: 0201398249).

*SAP R/*3 *Implementation Guide: A Manager's Guide to Understanding Sap* by Bradley D. Hiquet, Kelley-Levey, Associates, and Anthony F. Kelly, Indianapolis: Macmillan Technical Publishing, 1998 (ISBN: 1578700639).

*SAP R/*3 *Process Oriented Implementation: Iterative Process Prototyping* by Gerhard Keller, Thomas Teufel, New York: Addison-Wesley Pub Co., 1998 (ISBN: 0201924706).

In one embodiment, the business planner system offers a Web interface to permit a retailer or remote sales staff member to experiment with a variety of scenarios to determine the benefits of alternate promotions. A user may access the business planner system or needed manufacturer databases using a Web browser on a personal computer or other computer connected via the Internet or other network to a server owned or controlled by the manufacturer. Access to certain aspects of the business planner system or certain databases may be restricted based on the identity of the user, who may be required to log on with a username and password or who may be identified with biometrics such as thumb scan, retina scan, voice matching, etc. Retailers, for example, may be provided a lower level of access than employees of the manufacturer.

One embodiment showing several features of the business planner system 1 is illustrated in FIG. 1. Sales staff representing or employed by the manufacturer are shown for one division, such as a geographical region or a particular chain of stores. Sales staff in the division develop promotion plans 2 for a given time period, such as a three- or six-month interval.

Proposed promotions are entered into a computer program that runs a lift model 4 for the products and markets of concern in the division. Prediction of increased sales, or sales lift, due to a promotion is achieved using mathematical models for market response to a set of promotion conditions, with a plurality of promotion types being available in the model. The models may be derived from correlations of point-of-sale (POS) data with past promotions and, in some embodiments, may be updated continuously as POS data is obtained for each promotion. Information Resources, Inc. (IRI) (Chicago, Ill.) and A. C. Nielsen (Stamford, Conn.) are examples of commercial sources of household product data and POS data in particular, and both have the ability to provide lift models for a given product. Commercially-provided lift models may be used, or in-house models may be developed from available POS data or other data using suitable techniques for regression or multivariate analysis. For example, the PRO-MOCAST-brand forecasting tool from the University of California at Los Angeles may be used. This tool is believed to be offered commercially by ems (Efficient Market Services, Inc.) (Deerfield, Ill.). This tool uses historical databases of sales for a variety of promotion conditions at specific retailers and applies a 67-variable regression model to predict how a planned promotion will affect sales in a particular store. The tool is described by Lee G. Cooper et al. in "PromoCast™: A New Forecasting Method for Promotion Planning," *Marketing Science*, Vol. 18, No. 3, 1999, pp. 301-16, incorporated herein by reference. The PromoProphet™ system from IRI may also be used, as described by R. Margulis in *Retail Info Systems News*, June/July 1998, at www.risnews.com/archive/June98_8.shtml.

The lift model may use a predicted base volume for the division as further input. The sales, sales lift, and profit are then computed 6, based on the lift model. These predicted results 6 are compared 8 with marketing objectives 10 and predicted capacity 12 for the product in question to see if the sales expected to occur in light of promotion plans are aligned 14 with corporate plans and objectives. If the predicted results are in alignment, then the promotion may proceed to completion 16. If the predicted results are not in alignment, then a decision 18 is made whether to modify the promotion plans or operation plans, with consideration of marketing objectives 10. Adjustments to the promotion or operation plans 2 are then made, as appropriate, and the modified plans are iterated through the process.

Similar predictions may be made for multiple divisions (not shown), with each division applying a lift model 4 to predict sales. Predicted sales 6 may then be integrated for comparison 8 with predicted capacity 12 or other production plans, and may be integrated or treated separately for each division for comparison to marketing objectives 10.

Figure 2:
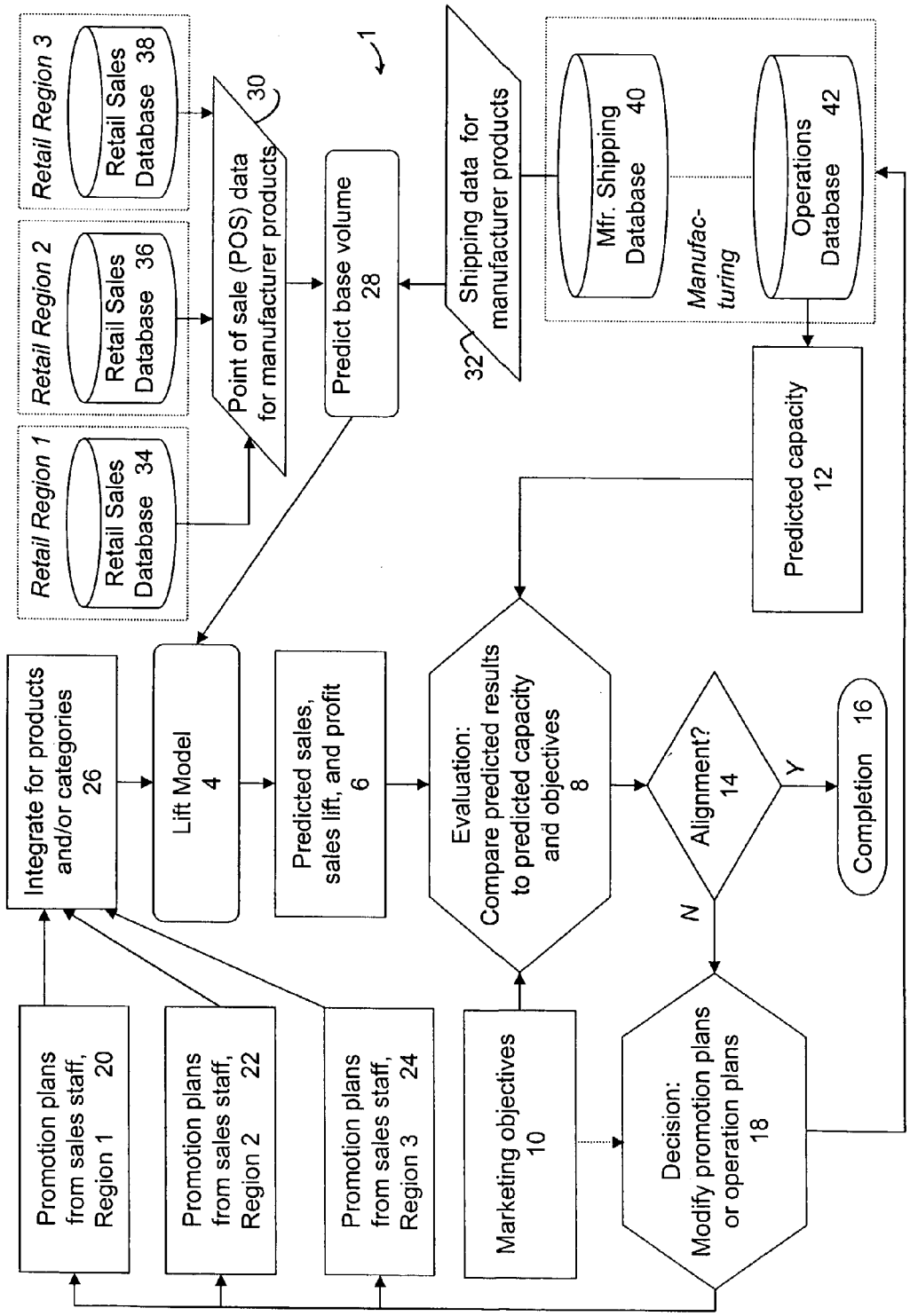
FIG. 2 is a flowchart illustrating additional features of the business planner system of FIG. 1.

An embodiment showing additional features of the business planner system 1 is illustrated in FIG. 2. Sales staff representing or employed by the manufacturer are shown for three regions 20, 22, and 24. Sales staff in each region develop promotion plans for a given time period, such as a three- or six-month interval. For example, sales staff in Region 1 may propose a direct mail coupon promotion offering 50 cents off each unit of the product, where the coupons are to be distributed on a particular date. Sales staff in Region 2 may propose a temporary price reduction with two retailers for overlapping periods of time. Finally, sales staff in Region 3 may propose a 60 cent price reduction for loyalty card users of a single retailer. Proposed promotions from each of the sales staff groups are supplied over a network to the manufacturer, and specifically to a server owned or controlled by the manufacturer, where the promotions are integrated 26, or rolled up, to provide the manufacturer with the combined plans from a plurality of sales regions where the product or product category is sold.

The plurality of sales regions may represent any fraction of the market, such as the entire market for the product, whether the market is global, in a specific country, or in a geographical region. The plurality of sales regions may also represent a majority of the total sales volume for the product, such that the combined sales regions may be expected to account for at least about 50% of the total sales of the product, more specifically at least about 70% of the total sales of the product, and more specifically about 90% of the total sales of the product.

The promotions for each region are linked to the sales lift model 4, allowing model predictions 6 to be calculated. Application of the sales lift model generally includes predicting the sales lift separately for each region based on regional plans and predicted regional base volume, though predictions may be done at an aggregate level if desired or for individual stores or groups of stores for specific retailers. Base volume is predicted 28 based on POS data 30 and shipping data 32 for the product. POS data 30 is calculated from a retail sales database for each region including data from retail sales in that region. In the example shown in FIG. 2, three regions 34, 36, and 38 are considered. Shipping data 32 is calculated based on data from a manufacturer shipping database 40, which also obtains data from an operations database 42.

Sales data from various regions may be used to establish the respective base volume predictions 28 for each division, or a collective base volume. When POS data 28 or other reliable sales information is not available or is too costly, shipping data 32 may be used to obtain an estimate of base volume, though filtering and smoothing of sales data may be needed to estimate the true base volume. One source of base volume data is the Efficient Market Services, Inc. (Deerfield, Ill.), which uses the "ems algorithm" based on weighting of sales yesterday, a week ago, and eight days ago, if those days were non-promotion days for the product in question. For a short time period, base volume may be estimated from consumer sales data in the time period immediately preceding a promotion. For longer periods of time such as those, for example, greater than a month, base volume should be estimated through consideration of population trends and other factors as well, when such data are available. In the absence of POS data 28, base volume may be estimated from shipping volume records using a base volume calculator, as described herein. Of course, any suitable method for calculating base volume may be used.

Predicted sales, sales lift, and profits to the manufacturer and/or retailers are calculated 6, generally at a regional or store-based level, followed by integration of the regional or store-based results (not shown), and then compared 8 to marketing objectives 10, predicted capacity 12 and other business objectives or constraints, including production plans and constraints available from the operations database 42.

If the predicted sales and profit levels 6 are in alignment 14 with marketing objectives 10, manufacturing capacity 12, or other constraints or objectives, the promotion may proceed to completion 16. If the predicted sales and profit levels 6 are out of alignment with marketing objectives 10, manufacturing capacity 12, or other constraints or objectives, the sales staff in one or more regions receives instructions to bring the predicted sales and profits in line with corporate needs 18. For example, if the sales lift model predicts that the sales volume will be too low, one or more of the sales regions will be asked to increase the level of promotion to increase sales, such as by offering a higher discount or by increasing advertising. The request for a modification in sales plans may be done manually, or a computerized means may suggest the region or combination of regions with the greatest potential for low-cost modifications to bring the integrated plans in alignment with corporate objectives. One or more new promotions will then be planned and considered in the sales lift model to bring predicted sales and profits better into alignment with corporate objectives and constraints. If alignment may not be achieved or may not be achieved without excessive costs, changes may need to be made in marketing objectives 10 or in manufacturing plans.

Figure 3:
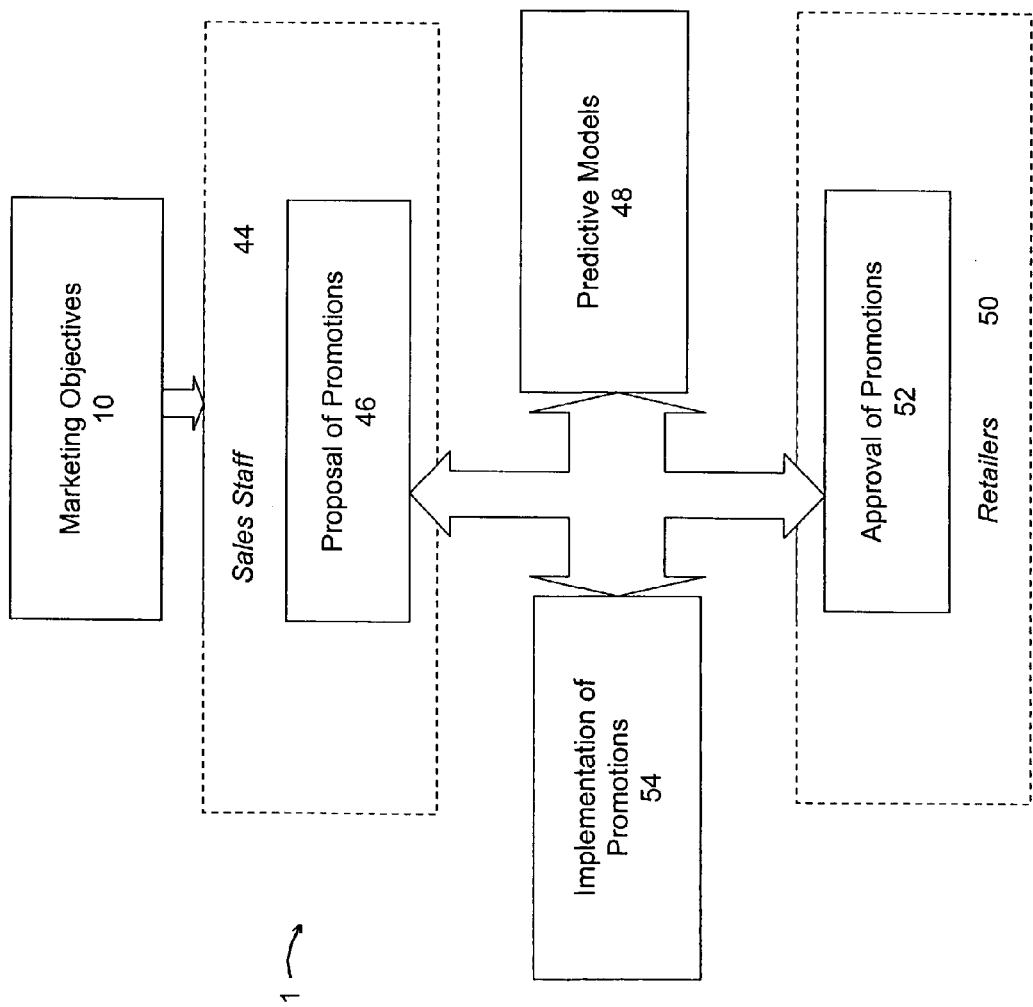
FIG. 3 is a flowchart illustrating additional features of the business planner system of FIG. 1.

In any case, the sales lift model 4, and integrating promotion plans from multiple regions 26, allow the manufacturer to predict future sales and profits and to bring promotions and marketing objectives into alignment in an interactive manner. As shown in FIG. 3, sales staff members 44 propose promotions 46 that are adjusted to meet marketing objectives 10. Proposed promotions 46 are analyzed with predictive models 48 such as the sales lift model to predict profitability, sales volume, and so forth, and the predicted information is used to show the benefit to retailer 50 and obtain their approval or support 52 for the proposed promotions 46, which are then implemented 54.

Sales data during promotions may also be used to continuously improve the sales lift models by correlating actual sales lift with details of the promotions being run. Demographics of the store and region may also be considered in the sales lift model.

The system further comprises optional tools for dynamic pricing, wherein the price to be paid by the retailer for the goods is a variable dependent on one or more factors such as time, projected demand, projected raw materials costs, and so forth. In one embodiment, the unit price paid by the retailer for use in a model predicting retailer profit is a time-dependent variable whose value at a given time is projected by the manufacturer based on forecasts of material costs and other factors, and is available for use in the model of profitability by accessing a manufacturer database of projected price to the vendor. The price may also be offered by the manufacturer in a database as a function of retailer volume, incorporating volume discounts, for example. In another embodiment, the price offered by the manufacturer in the database depends on the specific retailer, incorporating existing contractual arrangements regarding pricing. The price may also be offered as a tentative prediction responsive to input from the retailer.

It is possible for a retailer or vendor to input certain promotion parameters such as volume expectations, profit limits, etc., and allow the business planner system 1 to generate promotion scenarios that meet these requirements using models and possible promotion conditions. In this case, the retailer or vendor may then select a scenario and apply it to the business planning system. In essence, this requires adapting the software to provide an inverse solution, wherein the desired solution (financial returns or sales lift, for example) is provided as input, followed by a computer-assisted search for promotion conditions that may yield the solution. In some cases, a nearly infinite combination of conditions, such as combinations of sales price discount, retailer payout to the customer, coupon promotions, etc., may achieve the targets. The software may then identify the parameter space capable of providing the solution or offer a range of conditions for further examination, or request additional restraints on the solutions, such as the type of promotion, the maximum discount allowed, etc.

In another embodiment, the business planner system 1 is integrated with a transactional system such as the SAP R3 system for dynamic pricing capabilities, wherein the manufacturer cost of the goods under consideration is a variable that depends in part on forecasted raw material costs, expected market demand, predicted transportation costs, regulatory costs, and so forth. The planned wholesale price of the goods for future dates is also a dynamic variable depending on business objectives, predicted demand, and product cost. Thus, predictions about future promotions may take into account available information from a plurality of sources that will affect future costs and future prices. The retailer using a business planner system Web site may only access information reflecting future wholesale prices and suggested retail prices, while sales staff or other agents of the manufacturer may have access to projected production costs and other costs, as well as planned wholesale prices and suggested retail prices.

The business planner system 1 may also be adapted to handle the forward buying behavior of customers. Forward buying is the practice employed by some retailers of stockpiling large quantities of a product when it is offered at a lower-than-normal price by the manufacturer during a promotion, allowing them to sell the stockpiled product at the normal price after the promotion, thus making additional profit. This is not desirable from the perspective of the manufacturer because the cost incurred for offering the goods at a reduced price is not used to increase consumer demand. Past forward buying behavior of a customer may be indicative of general practices, so the business planner system 1 may include a module that tracks past forward buying behavior and extrapolates to estimate the forward buying actions of the customer for a given planned promotion. The business planner system 1 may then include the anticipated cost of forward buying for a particular customer into the net costs to the manufacturer of the promotion. If desired, this information may then be applied by the manufacturer to negotiate a favorable alternative to forward buying with the customer. For example, the manufacturer may show the customer what their expected forward buying behavior is and what the expected profit to the customer is by forward buying, and then offer an alternative that provides the same profit to the customer but which also increases consumer demand or manufacturer profit. For example, the manufacturer may offer an additional or extended promotion or additional pay out to the vendor.

The business planner system 1 has two planning modes. The full mode allows planning from a consumer purchase perspective and builds shipment estimates and supply chain demand. Under this mode a complete set of retail and vendor financial figures are available for follow-up evaluation. The second mode referred to as "Lite" allows the planner to input shipment estimates and the business planner system 1 will optionally project consumer demand. In this mode, only vendor financial facts are present and no retail pricing, merchandising, or modeling is available. This mode presents an alternate planning mode often used for wholesalers or small retail customers.

Shipping practices, year-end practices, and other factors may result in intermittent demand rather than steady demand. To better handle intermittent demand, the business planner system 1 may incorporate suitable systems for forecasting intermittent demand, such as those disclosed in U.S. Pat. No. 6,205,431, "System and Method for Forecasting Intermittent Demand," issued Mar. 20, 2001 to T. R. Willeman and C. N. Smart.

Transactions involving multiple currencies may be handled with suitable means, such as those disclosed in U.S. Pat. No. 6,205,433, "System and Method for Multi-currency Transactions," issued Mar. 20, 2001 to B. P. Boesch et al. Methods for handling payment and purchase transactions may also be handled with any suitable method, such as that of U.S. Pat. No. 6,205,437, "Open Network Payment System for Providing Real-Time Authorization of Payment and Purchase Transactions," issued Mar. 20, 2001 to D. K. Gifford.

Data information from multiple sales staff and/or multiple vendors or from other sources may be integrated using any suitable method, such as that of U.S. Pat. No. 6,205,446, "Method for Merging Multiple Knowledge Bases into One Optimized and Compressed Knowledge Base," issued Mar. 20, 2001 to S. Mittak and S. S. Khedkar.

Figure 4:
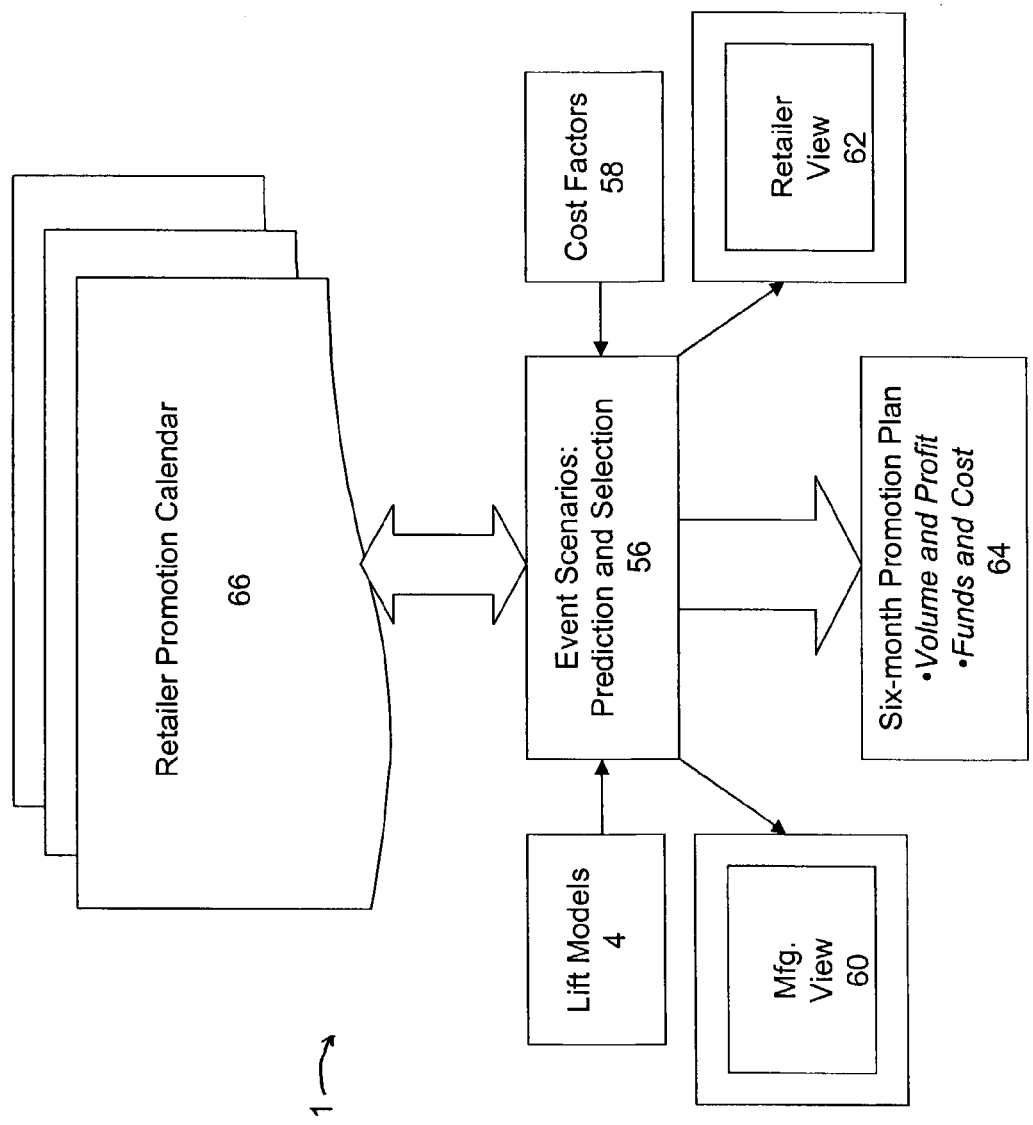
FIG. 4 is a flowchart illustrating several promotion and production planning features of the business planning system of FIG. 1.

The roles of the business planner system 1 in the successful scheduling of promotions and production levels are shown in FIG. 4. The business planner system 1 is used to predict the outcomes of various event scenarios 56, from which the most favorable scenarios are selected. Lift models 4 and cost factors 58 are used to predict profitability to retailers and/or the manufacturer. The results may be shown to the manufacturer in a manufacturer view 60, with access to all information and to results from multiple regions and retailers. The results may also be shown to individual retailers in a retailer view 62, with access to results predicted for the particular retailer in question. These views may be presented on a computer screen with a Web browser or custom software. The selected scenarios are used to create a promotion plan for the manufacturer, shown here as a six-month promotion plan 64, and may be integrated with the retailer promotion calendar 66 of each respective retailer. The event scenario 56 may also be aligned with other aspects of the retailer promotion calendar 66. For example, if the retailer is planning a major promotion of a competitive product during one time period, the manufacturer may need to adjust the timing of a planned promotion accordingly. Also, it may not be in the best interest of a retailer to participate in two competitive promotions at the same time. Iterative planning may be needed to plan promotions that align with the needs and plans of the retailers as well as the manufacturer. In one embodiment, the business planner system 1 includes calendaring modules that allow integrated promotion plans to be graphically displayed and to compute the impact of modifications to the plans.

Figure 5:
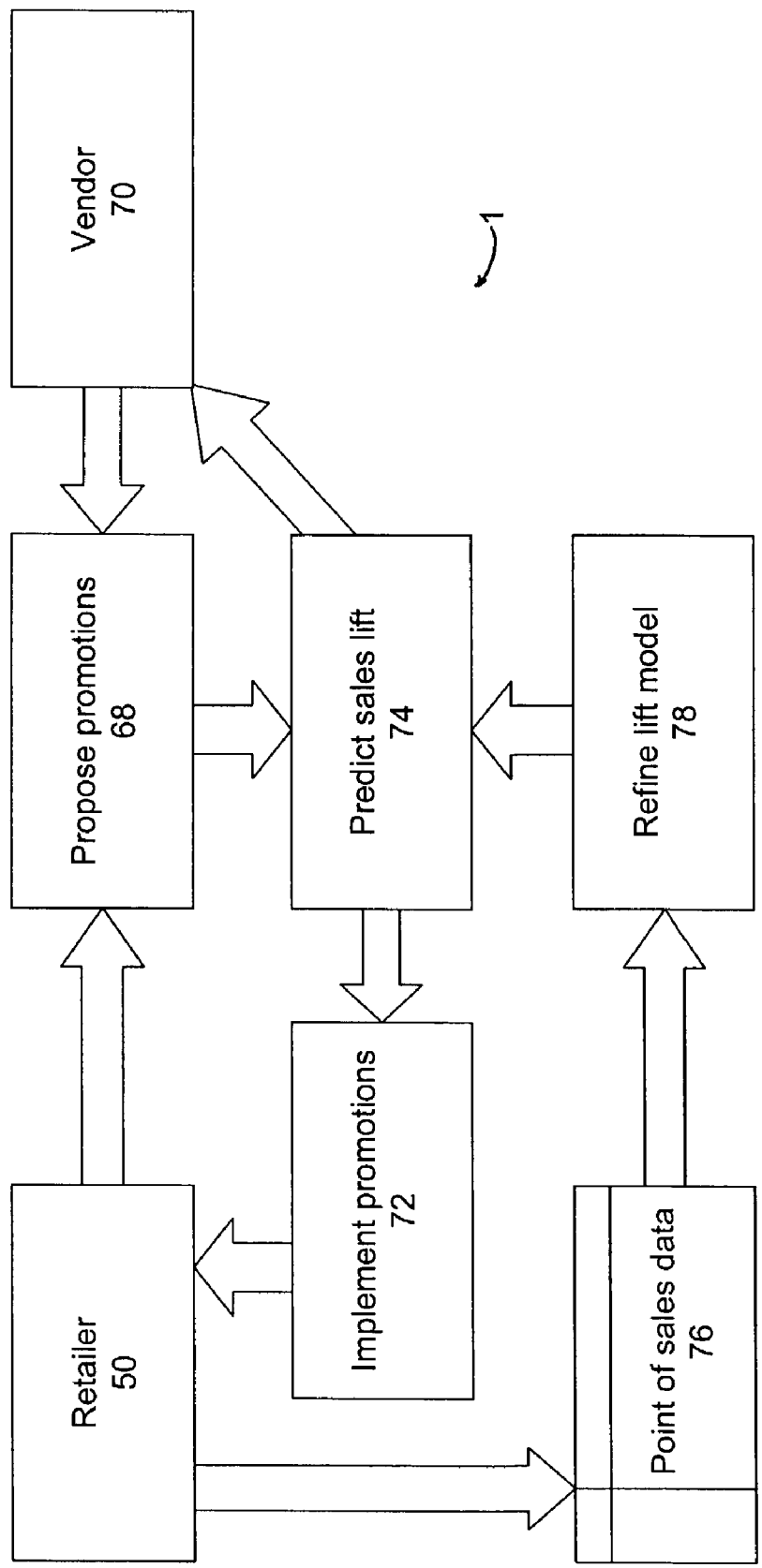
FIG. 5 is a flowchart illustrating several sales lift features of the business planning system of FIG. 1.

FIG. 5 illustrates one aspect of the continuously refinable and interactive nature of the sales lift models 4. As promotions are proposed 68 by the vendor 70 and a retailer 50, and implemented 72 by the retailer 50, in light of predicted sales lift 74 and profitability, actual sales data may be tracked, for example, via scanning at check out to provide POS data 76. The actual sales data may then be used to calculate actual sales lift, which may then be correlated with the promotion to further refine the lift model or models 78 used to predict the outcome of promotions 74. Future predictions are thus enhanced by regular analysis of POS data 76.

Figure 6:
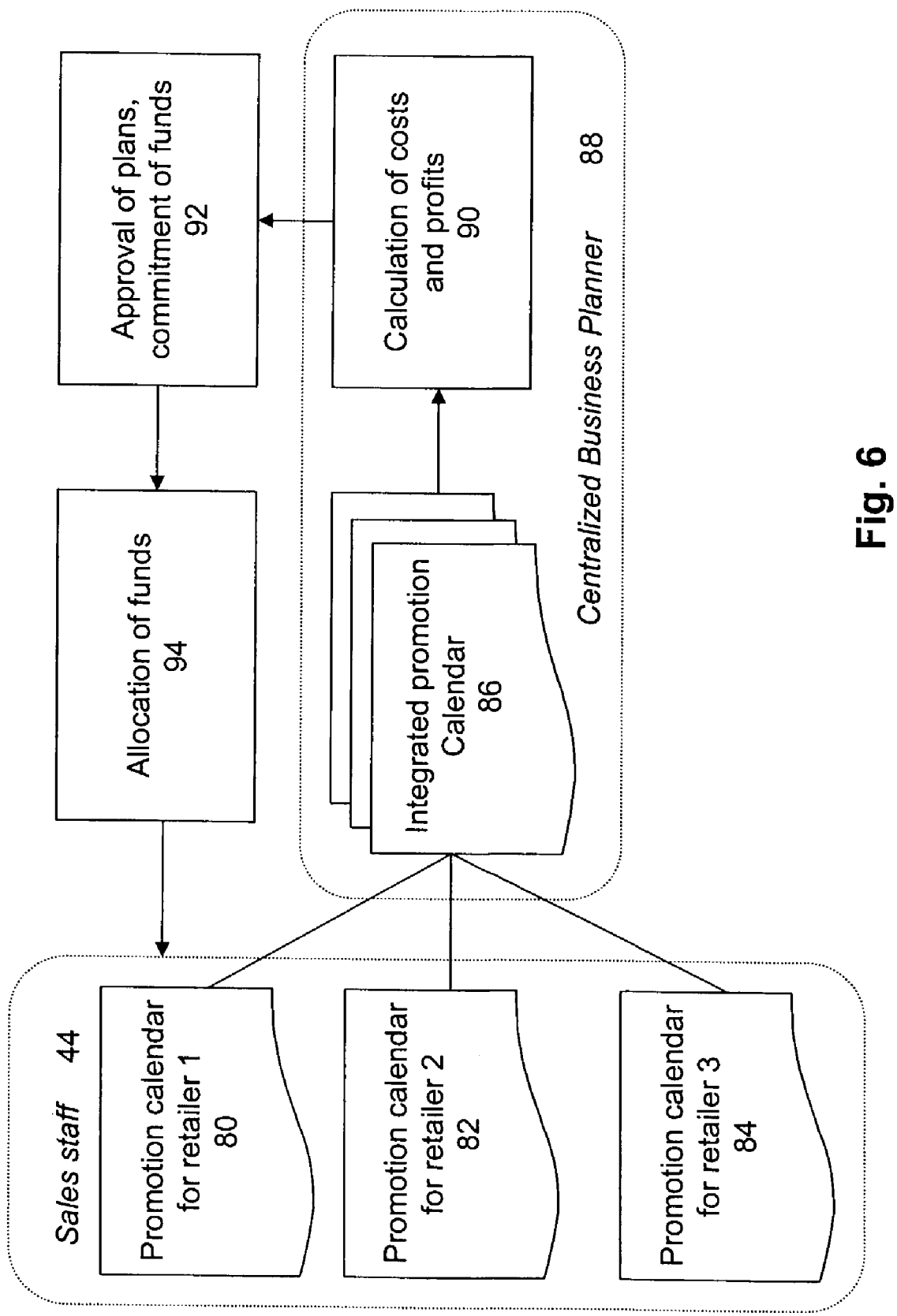
FIG. 6 is a flowchart illustrating several promotion planning features of the business planning system of FIG. 1.

As shown in FIG. 6, the business planner system 1 may also include means for tracking, managing, and allocating funds for promotions. Promotional plans and calendars from multiple retailers 80, 82, and 84 may be entered by the respective sales staff 44 in modules of the business planner to create an integrated promotions calendar 86 on a central server hosting the centralized business planner software 88, permitting predictions of costs and profits 90 to be made. The projected costs for the planned promotions may then be reviewed by management and approved 92 or iteratively revised (not shown). For example, after a sales representative 44 for the manufacturer has entered preliminary promotional plans in the business planner system 1 to create a promotional calendar for a retailer 80, the business planner system 1 may compute the funds required for the plan, or the funds may be estimated manually and entered by the sales representative. The manufacturer may then review integrated plans from a plurality of sales representatives to determine the total funds required. If the required funds are excessive, directives to modify the planned promotions may be issued to the sales representatives. Otherwise, the plans may be approved and funds allocated 94 for the promotions. As the actual costs accumulate either by paying bills or through off-invoice allowances, the funds information is updated to track actual costs. The actual costs may be used for plan evaluation to improve the return on investment for successive promotions. For example, formulas predicting the cost of a promotion may be updated based on the actual costs of a promotion for better planning in the future.

The system may also provide a means to transfer funds, file claims, and directly pay customer banks, if desired.

The system may further be used with shelf-space management systems, such as the MARKETMAX-brand Planogram Manager, whereby planned promotions also include information pertaining to adjustments in shelf-space arrangements during the promotion.

Numerous computer models for allocation of shelf-space and estimation of the economic impact of particular shelf-space arrangements have been reported in the literature, and any of these may be implemented as part of the business planner system 1 to allow the vendor and/or retailer to consider the effect of shelf-space allocation on the projected sales, including during an active promotion or in the calculation of baselines. Exemplary models include that of Timothy L. Urban, "An Inventory-Theoretic Approach to Product Assortment and Shelf-Space Allocation, *Journal of Retailing*, Vol. 74, No. 1, 1998, pages 15-35, which discusses the integration of existing inventory-control models, product assortment models, and shelf-space allocation models to estimate the demand for a product or products as a function of several factors, including the existing inventory level. The approach of Urban may be incorporated in the business planner system 1 to consider the change in consumer demand that may occur due to changes in the details of the shelf-space handling of the product and related products during a promotion or during other times as well. Cross-elasticity may also be included the model, as Urban notes. The business planner system 1 may include models based also on Urban's earlier work, T. L. Urban, "A Mathematical Modeling Approach to Product Line Decisions," *Journal of Marketing Research*, Vol. 6, No. 1, 1969, pages 40-47, which provides a means to determine which products should be included in a product line based on a polynomial formula to model product demand as a function of price, advertising, and distribution, with main and cross-elasticities of marketing variables considered, with an iterative search routine recommended for solution. Examples of studies showing means of estimating cross-elasticity coefficients are reviewed by R. C. Curhan, "Shelf Space Allocation and Profit Maximization in Mass Retailing," *Journal of Marketing*, Vol. 37, 1973, pages 54-60, and R. C. Curhan, "The Relationship Between Shelf Space and Unit Sales in Supermarkets," *Journal of Marketing*, Vol. 36, 1972, pages 406-12.

Cross-elasticity may be modeled to include asymmetry in demand such as a change in price of a high-priced brand will have a more dramatic effect on market share of a low-price brand than a change in price of the low-price brand will have on the market share of the high-price brand. Cross-elasticity may also be modeled to include the neighborhood price effect: the observation that brands that are closer to each other in price have larger cross-price effects than brands that are priced farther apart. Cross-elasticity may also be modeled to include other known effects, such as those disclosed, for example, by R. Sethuraman, V. Srinivasan, and D. Kim, "Asymmetric and Neighborhood Cross-Price Effects: Some Empirical Generalizations," *Marketing Science*, Vol. 18, No. 1, 1999. Such other effects include the role of the number of competing products in a category, because cross-price effects tend to be greater when there are fewer competing brands in the product category. The effect of adding new products, or product proliferation, on demand may also be modeled, for example, based on the work of B. L. Bayus and W. P. Putsis, Jr., "Product Proliferation: An Empirical Analysis of Product Line Determinants and Market Outcomes," *Marketing Science*, Vol. 18, No. 2, 1999. Bayus and Putsis propose a three-equation simultaneous system to estimate market outcomes of a firm's product-line decisions. In particular, they specify market share, price, and product line length equations, which are estimated by three-stage least squares. The effect of adding a new product line on the sales of other products may then be estimated.

The business planner system 1 uses cross elasticity factors to predict not only how a price reduction or other promotion will increase sales of the promoted product, but how it will affect sales of other products as well, including products in other categories, products from other manufacturers, or products that might not seem related at first glance. The business planner system 1 includes deriving or obtaining cross elasticity coefficients, and then predicting sales lift and ROI for any of the following: a) a specific product; b) a category of products from a single vendor; c) products from multiple vendors within a common category; d) multiple products from multiple vendors. The main benefit is to the customer, but the manufacturer of the product being promoted benefits from knowledge of how the promotion will affect the total bottom line for the retailer, including increased sales of other products from other vendors.

Other models may be used that incorporate cross-elasticity, including the work of M. Corstjens and P. Doyle, "A Model for Optimizing Retail Space Allocations," *Management Science*, Vol. 27, No. 7, 1981, pages 822-33. Other modeling approaches of potential value when incorporated into the business planner system 1 include multi-item inventory models in general, and specific models such as the following:

The model of F. S. Zufryden, "Dynamic Programming Approach for Product Selection and Supermarket Shelf-Space Allocation," *Journal of the Operational Research Society*, Vol. 37, No. 4, 1986, pages 413-22, which may be used to optimize the selection of products allocated to shelf-space units in supermarkets, accounting for space elasticity, cost of sales, and potential demand-related marketing variables.

The model of Bultez and Naert, which is similar to that of Corstjens and Doyle, but uses marginal analysis based on a general theoretical formulation. They consider interdependencies prevailing across and within product-groups. See A. Bultez and P. Naert, "S.H.A.R.P.: Shelf Allocation for Retailers' Profit," *Marketing Science*, Vol. 73, No. 3, 1988, pages 211-31.

The model of Anderson and Amato for simultaneous analysis of product assortment and shelf-space allocation problems. See E. E. Anderson and H. N. Amata, "A Mathematical Model for Simultaneously Determining the Optimal Brand-Collection and Display-Area Allocation," *Operations Research*, Vol. 22, No. 1, 1974, pages 13-21.

The model of Borin et al. as described in N. Borin, P. W. Farris, and J. R. Freeland, "A Model for Determining Retail Product Category Assortment and Shelf Space Allocation," *Decision Sciences*, Vol. 25, No. 3, 1994, pages 359-84, and in N. Borin and P. W. Farris, "A Sensitivity Analysis of Retailer Shelf Management Models, *Journal of Retailing*, Vol. 71, No. 2, 1995, pages 153-71, which integrates product assortment and shelf-space allocation analyses including cross-elasticity effects of substitute items and the effect on demand of products when other products are not included in the assortment. A solution strategy is suggested in the work as well ("simulated annealing").

The model of Baker and Urban for the effect of displayed inventory on product demand, disclosed in R. C. Baker and T. L. Urban, "A Deterministic Inventory System with an Inventory-Level-Dependent Demand Rate," *Journal of the Operation Research Society*, Vol. 39, No. 9, 1988, pages 823-31. See also R. C. Baker and T. L. Urban, "Single-Period Inventory Dependent Demand Models," *Omega*, Vol. 16, No. 6, 1988, pages 605-07.

Solution techniques for these models may include any of the ones taught or recommended in the respective references, or more modern techniques, including neural networks, fuzzy logic systems, genetic algorithms, and the like. Use of scanner data, consumer household data, or other data sources to provide empirical models for demand or other factors to be used in the business planner system 1 may be analyzed using suitable methods including generalized linear models such as regression, as well as loglinear, logit, and probit models. An example is discussed at www2.chass.ncsu.edu/garson/pa765/logit.htm.

Historical sales information embodied in a memory device (e.g., a point-of-sales database) can be mined by any suitable data mining method for relationships between promotions and products, including cross-elasticity factors, sales lift as a function of market segment (demographic factors, etc.), impact of competitive promotions on vendor promotions, and other factors that may not be readily apparent after human scrutiny of the data. Exemplary methods for data mining are given in Predictive Data Mining: A Practical Guide by Sholom M. Weiss and Nitin Indurkhya (San Francisco: Morgan Kaufmann Publishers, 1997), ISBN 1-55860-403-0. Data mining may be done according to CRISP-DM standards in "CRISP-DM 1.0: Step-by-step Data Mining Guide" by P. Chapman et al., at www.crisp-dm.org/CRISPWP-0800.pdf. Exemplary software tools for data mining include EDM (Enterprise Data-Miner) and DMSK (Data-Miner Software Kit), both available from Data-Miner Pty Ltd (Five Dock, Australia). Any suitable data visualization or pattern detection tool can also be applied, such as the OMNIVIZ-brand software system of OmniViz, Inc. (Maynard, Mass.).

Point-of-sale scanner data need not be limited to data scanned by optical scanners, but may also include data obtained by other electronic scanning means, such as the use of radiofrequency identification (RFID) technology, in which minute "smart tags" attached to products can emit a radio signal conveying a product identification code that can identify the item being purchased.

The business planner system 1 may also include models to predict how a promotion expands short-run and long-run category demand, which may be based on work such as that disclosed by V. R. Nijs et al., "The Category-Demand Effects of Price Promotions," *Marketing Science*, Vol. 20, No. 1, 2001. Nijs et al. examine category-demand effects of consumer price promotions across 560 consumer product categories over a 4-year period. The data describe national sales in Dutch supermarkets and cover a broad marketing mix, i.e., prices, promotions, advertising, distribution, and new-product activity. These methods focus on the estimation of main effects, such as the dynamic category expansive impact of price promotions, as well as the moderating effects of marketing intensity and competition on short- and long-run promotional effectiveness. Multivariate time-series analysis is used to disentangle short- and long-run effects. First, these methods conduct a series of tests to determine whether or not category demand is stationary or evolving over time. The results are incorporated in the specification of vector-autoregressive models with exogenous variables (VARX models). The impulse-response functions derived from these VARX models provide estimates of the short- and long-term effects of price promotions on category demand. These estimates, in turn, are used as dependent variables in a series of second-stage regressions that assess the explanatory power of marketing intensity and competition. Results are given in the form of empirical generalizations on the main effects of price promotions on category demand in the short and the long run and through statistical tests on how these effects change with marketing intensity and competition. The findings generate an overall picture of the power and limitations of consumer price promotions in expanding category demand.

Nijs et al. report that category demand is predominantly stationary, either around a fixed mean or a deterministic trend. Although the total net short-term effects of price promotions are generally strong, with an average elasticity of 2.21 and a more conservative median elasticity of 1.75, they rarely exhibit persistent effects. Instead, the effects dissipate over a time period lasting approximately ten weeks on average. By contrast, the successful introduction of new products into a category is more frequently associated with a permanent category demand increase. Thus, a model that relates demand to promotions may include factors that depend upon the nature of the product, such as a new product category, a new product in an existing category, an improved product, or an existing product, using a menu of tailored relationships between promotion and demand that depend on the nature of the product.

The impact of advertising on sales may be predicted using any suitable method or model. Such predictions may also include estimates based on Internet advertising or other alternative media sources, using, for example, the work of F. Zufryden, "Predicting Trial, Repeat, and Sales Response from Alternative Media Plans," *Journal of Advertising Research—Special Classic Issue*, Vol. 40, No. 6, November/December 2000, as well as related works of Zufryden or others, including:

- X. Drèze and F. Zufryden, "A Web-Based Methodology for Product Design Evaluation and Optimisation," *Journal of the Operational Research Society*, October 1998, Vol. 49, No. 10, pp. 1034-43.
- F. Zufryden, "A Model for Relating Advertising Media Exposures to Purchase Incidence Patterns," *Management Science*, Vol. 33, No. 10, October 1987.
- F. Zufryden, and G. Tellis, "Tackling the Retailer Decision Maze: Which Brands to Discount, How Much, When and Why", *Marketing Science*, Vol. 14, No. 3, 1995.
- F. Zufryden and J. H. Pedrick), "Measuring the Competitive Effects of Advertising Media Plans," *Journal of Advertising Research*, November/December 1993.
- Zufryden, Fred, "The WNBD: A Stochastic Model Approach for Relating Explanatory Variables to Consumer Purchase Dynamics," the *International Journal of Research in Marketing*, Vol. 8, 1991.

The business planner system 1 may be integrated with Continuous Replenishment systems. Continuous Replenishment refers to the practice of partnering between distribution channel members that changes the traditional replenishment process from distributor-generated purchase orders, based on economic order quantities, to the replenishment of products based on actual and forecasted product demand. Inventory levels and operating costs may be reduced by having products delivered on a frequent, as-needed basis. Consumer demand based on scan data and sales forecasts, including business planner system forecasts for promotions, may drive warehouse replenishment orders and shipping.

Figure 7:
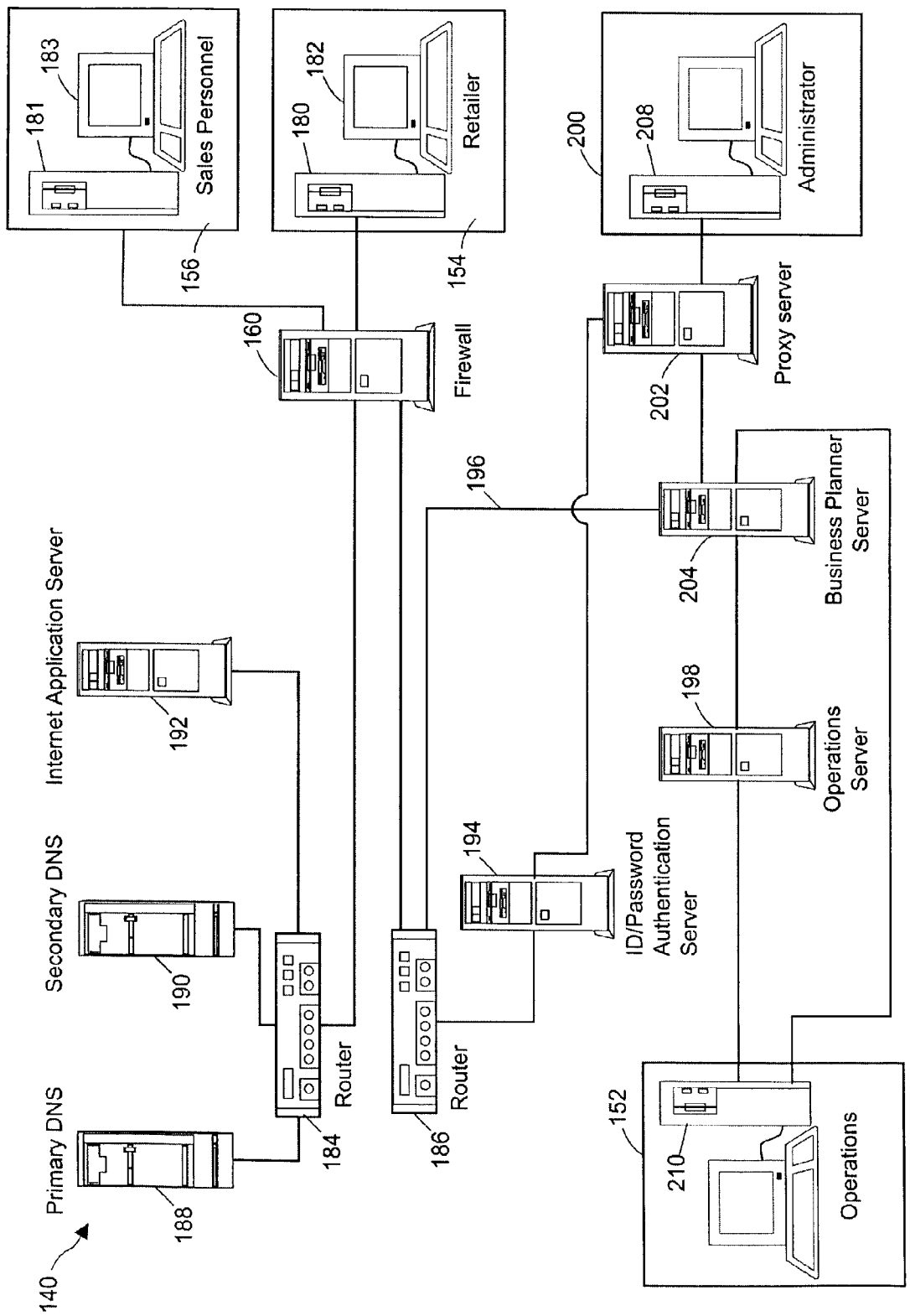
FIG. 7 is a schematic representation of the hardware for a computer network that may be used for the business planner system of FIG. 1.

FIG. 7 shows one embodiment of a computer network 140 that may be used for the business planner system 1 of the present invention. As depicted, a retailer 154 may use the retailer's computer systems 180 to access the computer network 140 through a firewall 160 (serving as a gate) under control of the manufacturer. A user on behalf of the retailer 154 enters a URL to access a secure Web site. The URL request goes through the firewall 160 to a first router 184 (e.g., a CISCO-brand router) where either a primary DNS (domain name server) 188 or secondary DNS 190 determines the IP address to be used for the requested URL. A signal is then sent to the Internet application server 192, which generates a signal to create a Web page display. The signal is routed back to the computer 180 of the retailer 154 such that a Web page is displayed on a monitor 182. The displayed Web page requires the user to log in using a user ID and password. When the user ID and password are entered, that information is routed again through the firewall 160 to a second router 186 that directs the information to an ID/password authentication server 194 (e.g., an SQL server). If a valid user ID and password have been entered, a welcome page for the business planner system 1 is then displayed (e.g., a signal is sent to the Internet application server 192 which then sends a signal back to the computer 180 of the retailer to display a business planner system Web page).

The welcome page displayed after logging in is unique to the retailer 154 (i.e., it may have functions and an appearance customized for the specific retailer 154 or even the specific user or for the department in which the user is employed). The page may provide access to additional pages that contain information unique to the retailer 154, such as wholesale price information, access to terms of contracts and other agreements, details of past promotions, and plans for future promotions or product launches. Both historical information and forecasts may be provided regarding sales, shipment schedules, promotions, profitability, and so forth. Information about promotions and the information required to forecast profitability and sales lift may be stored on a business planner server 204, which may be a single server for multiple retailers and/or product lines, or may comprise multiple networked servers each dedicated to a particular product, product category, retailer, or collection of retailers. Programs for integrating planned promotions for a plurality of retailers and/or for a plurality of products may be hosted on the business planner server 204 or an operations server 198.

Information regarding planned production, wholesale costs, manufacturer profitability, and the like may be stored on the operations server 198. Operations 152, which may include mills or other business groups of the manufacturer, may use their computer systems 210 to provide information regarding production quantities and other factors to the operations server 198, and may access information regarding sales lift or promotions from the business planner server 204.

Using the retailer's computer systems 180 with access to the business planner system 1, the logged-in user may then enter various scenarios to determine how a proposed promotion may affect sales and profitability, or may explore cross-elasticity effects, for example. A scenario, such as a contemplated temporary price reduction for a given product during a specific time period, may be entered, resulting in a signal routed through the firewall 160 to the business planner server 204 where sales lift and retailer profit or other output variables may be calculated and then displayed on a Web page based on a signal sent back to the computer 180 of the user via the firewall 160.

The information accessible to the retailer 154 may be restricted relative to the information accessible to sales personnel 156, who may be able to examine the effect of promotions for a plurality of retailers 154 and may also be able to observe displays via a computer system 181 on a monitor 183 showing a broad range of information such as profitability to the manufacturer as well as to an individual retailer, and optionally the total predicted sales volume integrated across multiple retailers 154.

In receiving inputs from users such as employees of the retailer 154 or sales personnel 156 employed by the manufacturer, security means may be employed to verify the identity of the user. For example, an electronic signature may be obtained, or biometrics may be employed. For future auditing, the user ID, the electronic signature, and the requested information may all be stored (e.g., on the business planner server 196 or other server) to provide an audit trail.

In one embodiment, the business planner system 1 may include electronic means for placing and paying for an order from the manufacturer via the computer network 140.

The business planner system 1 is overseen by an administrator 200, who uses a computer system 208 to access the business planner server and its databases via a proxy server 202. Administrators 200 may modify database contents, enter administrative information to document changes for purposes of future auditing, modify accounts of both retailers 154 and sales personnel 156 (e.g., via the connection shown between the proxy server 202 and the ID/password authentication server 194), and so forth.

The network as accessed by the retailer 154 or sales personnel 156 may be a virtual private network (VPN), and may be based on Multiprotocol Label Switching (MPLS) technology, including embodiments discussed by M. Smetannikov in "MPLS VPNs Controversial," *Interactive Week*, Oct. 15, 2001, p. 20, including the ExpressRoute service of Global Crossing (Beverly Hill, Calif.).

Integration of projected sales volume with supply chain systems is useful in ensuring the success of planned promotions, integrating production plans with marketing plans and combined sales staff activities. Use of the business planner system 1 allows sales staff in the field to understand the financial impact of their planned promotions, and to intelligently select from a plurality of promotion options based on the predicted returns. Further, sales staff may be provided with a tool to run multiple "what if" scenarios to show the financial returns to retailers for proposed promotions. Thus, for the first time, sales staffs are given tools to predict the financial impact of a planned promotion on both the manufacturer and the retailer, and the tools to carry out the planned promotion in a manner that corresponds to corporate production and marketing plans and objectives.

The business planner system 1 may be adapted for multinational or global use by adding translation modules to allow input and operation in multiple languages. The system may be configured to support any currency. Conversion to a standard currency may be accomplished through use of SAP BW or any other suitable data warehousing tool.

Use of the business planner system's profit-prediction tools may allow the manufacturer to maximize the return on funds allocated for promotions. A given promotion budget may be allocated between markets or geographical regions in a manner that optimizes profits, and a given quantity of funds for promotions in a given region or market may be optimized for maximum profits.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations that fall within the spirit and scope of the appended claims. Further, while the methods disclosed herein have been described and shown with reference to particular acts performed in a particular order, it will be understood that these acts may be combined, sub-divided, or re-ordered to form an equivalent method without departing from the teachings of the present invention. Accordingly, unless specifically indicated herein, the order and grouping of the acts are not limitations of the present invention.

We claim:

1. A method for predicting the profit attributable to a proposed sales promotion of a product, wherein the product has a wholesale price and a manufacturing cost per unit sales, the method comprising using a computer to perform the following steps:
   establishing a base volume for sales of the product in the absence of promotions, wherein the establishing act includes performing non-parametric regression of historical shipping data;
   determining a sales lift for a plurality of single promotions;
   correlating the sales lift with promotion information to provide a sales lift model;
   proposing a promotion having a cost per unit sales for a promotion time period and having a planned sale price for the product;
   applying the sales lift model to the proposed promotion to predict sales of the product for the promotion time period;
   calculating manufacturer profit based upon the product's predicted sales, cost per unit sales for promotion, wholesale price, and manufacturing cost per unit sales during the promotion time period.

2. The method of claim 1, wherein the promotion is selected from the group consisting of a temporary price reduction, a distributed coupon campaign, an in-store coupon campaign, a loyalty card promotion, a rebate, and an advertised price reduction.

3. The method of claim 1, wherein the promotion is selected from the group consisting of a sweepstakes, a free gift offered with purchase of the product, and an attached coupon for reduced cost for another service or product.

4. The method of claim 1, further comprising determining the expected cost incurred by customer forward buying based upon past forward buying behavior.

5. The method of claim 1, wherein the establishing act includes analyzing point-of-sale data from at least one time period lacking a promotion.

6. The method of claim 1, wherein the establishing act includes analyzing product shipping data.

7. The method of claim 1, wherein the establishing act includes Kalman filtering historical shipping data.

8. The method of claim 1, wherein the establishing act further comprises:
   obtaining a time series of shipping data;
   normalizing the time series;
   truncating large peaks in the time series associated with promotions;
   applying a numerical tool to the time series selected from a dynamic linear model or a Kalman filter;
   performing regression on the time series to obtain regression estimates;
   smoothing the regression estimates; and
   applying the regression estimates to predict base volume for the promotion time period.

9. The method of claim 1, further comprising modeling cross elasticity between products.

10. The method of claim 1, further comprising modeling cross elasticity between brands.

11. The method of claim 1, further comprising modeling cross elasticity between products from different vendors.

12. The method of claim 1, further comprising providing historical point-of-sale data for the product or a related product category during a time period including a plurality of single promotions.

13. A method for predicting the profit attributable to a proposed sales promotion of a product, wherein the product has a wholesale price and a manufacturing cost per unit sales, the method comprising using a computer to perform the following steps:

establishing a base volume for sales of the product in the absence of promotions, wherein the establishing act includes Kalman filtering historical shipping data;
determining a sales lift for a plurality of single promotions;
correlating the sales lift with promotion information to provide a sales lift model;
proposing a promotion having a cost per unit sales for a promotion time period and having a planned sale price for the product;
applying the sales lift model to the proposed promotion to predict sales of the product for the promotion time period;
calculating manufacturer profit based upon the product's predicted sales, cost per unit sales for promotion, wholesale price, and manufacturing cost per unit sales during the promotion time period.

14. A method for predicting the profit attributable to a proposed sales promotion of a product, wherein the product has a wholesale price and a manufacturing cost per unit sales, the method comprising using a computer to perform the following steps:
   establishing a base volume for sales of the product in the absence of promotions, wherein the establishing act further comprises:
      obtaining a time series of shipping data;
      normalizing the time series;
      truncating large peaks in the time series associated with promotions;
      applying a numerical tool to the time series selected from a dynamic linear model or a Kalman filter;
      performing regression on the time series to obtain regression estimates;
      smoothing the regression estimates; and
      applying the regression estimates to predict base volume for the promotion time period;
   determining a sales lift for a plurality of single promotions;
   correlating the sales lift with promotion information to provide a sales lift model;
   proposing a promotion having a cost per unit sales for a promotion time period and having a planned sale price for the product;
   applying the sales lift model to the proposed promotion to predict sales of the product for the promotion time period;
   calculating manufacturer profit based upon the product's predicted sales, cost per unit sales for promotion, wholesale price, and manufacturing cost per unit sales during the promotion time period.

* * * * *